US008662718B2

(12) United States Patent
Hashimoto

(10) Patent No.: US 8,662,718 B2
(45) Date of Patent: Mar. 4, 2014

(54) LIGHTING DEVICE WITH A HEAT SINK

(76) Inventor: Yasuki Hashimoto, New York, NY (US)

( * ) Notice: Subject to any disclaimer, the term of this patent is extended or adjusted under 35 U.S.C. 154(b) by 229 days.

(21) Appl. No.: 13/215,782

(22) Filed: Aug. 23, 2011

(65) Prior Publication Data

US 2013/0051034 A1 Feb. 28, 2013

(51) Int. Cl.
*B60Q 1/06* (2006.01)
*F21V 29/00* (2006.01)

(52) U.S. Cl.
USPC ............ 362/373; 362/269; 362/297; 362/293

(58) Field of Classification Search
USPC .................. 362/269, 275, 285, 287, 294, 373
See application file for complete search history.

(56) References Cited

U.S. PATENT DOCUMENTS 7,144,140 B2 * 12/2006 Sun et al. ...................... 362/373
7,758,223 B2 * 7/2010 Osawa et al. ................ 362/373

FOREIGN PATENT DOCUMENTS

| | | | |
|---|---|---|---|
| EP | WO 2009/071111 | A1 | 6/2009 |
| JP | H05-012912 | | 1/1993 |
| JP | 2009-218115 | A | 9/2009 |
| JP | WO 2010-090012 | A1 | 8/2010 |

* cited by examiner

*Primary Examiner* — Stephen F Husar
(74) *Attorney, Agent, or Firm* — Troutman Sanders LLP

(57) ABSTRACT

A lighting device has a lighting unit and a housing unit. The lighting unit includes a light source unit and a heat sink. The light source unit has a light source. The heat sink supports the light source unit. The heat sink has at least one open groove that allows air to flow between an inside of the lighting unit and an outside of the lighting unit. The housing unit houses at least a part of the lighting unit to support the lighting unit.

14 Claims, 8 Drawing Sheets

LIGHTING DEVICE WITH A HEAT SINK

FIELD OF THE INVENTION

The present invention relates to a lighting device with a heat sink.

BACKGROUND OF THE INVENTION

Lighting devices have been used in various applications, such as those for home use, industrial use, and commercial use, and developed with various light sources and structures in accordance with requirements of the applications. In such a lighting device, when a light source generates heat, it is necessary to take measures to deal with radiation of the heat so that the heat does not cause the lighting device to fail. As an example of those measures, a heat sink as a means of radiating heat is proposed to be installed to the lighting device.

In the conventional art, for example, a lighting fixture, which has a hollow cylindrical heat sink, is known. The lighting fixture has a socket to which a lamp is mounted, the hollow cylindrical heat sink, which surrounds the socket and is closed at one end. A heat transferring piece mounts the socket to an inner surface of the heat sink. The heat sink and the heat transferring piece are made of a metal that has high thermal conductivity. The heat sink has heat radiating fins around its outer circumference to radiate the heat of the lamp.

For another example, a lighting equipment, having a bracket to which a light source and a heat sink are fixed, is also known. The lighting equipment has a stage pivotally supported on a base and driven by an actuator. The stage is provided with a condenser lens such that a rear focal point of the lens is positioned on the pivot axis of the stage. The bracket is attached to the base. The light source, which is fixed to a surface of the bracket facing the lens, is positioned at the rear focal point of the lens. Light from the light source is transmitted through the lens. The heat sink is fixed on a surface of the bracket opposite to the surface of the bracket having the light source, to radiate the heat of the light source. A casing is attached to the bracket to enclose the heat sink.

Nevertheless, in such conventional lighting devices, even though measures for radiating heat of light sources by the use of heat sinks such as those described above have been proposed, there is still room for improvement. For example, in the above-described lighting fixture, the hollow cylindrical heat sink functions as a housing to support the light source and creates a closed space. In the above-described lighting equipment, the heat sink is fixed on the bracket which is attached to a casing to create a closed space to enclose the heat sink. Accordingly, in those conventional lighting devices, a sufficient radiating effect cannot be obtained for a high-power light source because the heat of the light source is adversely confined to the closed space.

Further, as in the above-described lighting fixture and equipment, because the light source and the heat sink in a conventional lighting device are both fixed directly or indirectly to a casing, a support bracket, a wall, a ceiling, or the like, an illumination angle of the light source cannot be effectively changed. If the illumination angle is to be changed, another member that can change the illumination angle must be further provided to the lighting device. Accordingly, those conventional lighting devices cannot be effectively made more compact in size.

SUMMARY OF THE INVENTION

One aspect of the present invention is to provide a lighting device having a lighting unit and a housing unit. The lighting unit includes a light source unit and a heat sink. The light source unit has a light source. The heat sink supports the light source unit. The heat sink has at least one open groove that allows air to flow between an inside of the lighting unit and an outside of the lighting unit. The housing unit houses at least a part of the lighting unit to support the lighting unit.

In the above lighting device, at least a portion of an outer surface of the heat sink may have a curved surface. Also, the curved surface of the heat sink may be substantially spherical. In addition, the heat sink may have a hollow body. The light source unit may be provided inside the hollow body of the heat sink. The heat sink may have at least two open grooves.

Further, in the above lighting device, the housing unit may have a cutout configured to house at least the part of the lighting unit to support the lighting unit. The cutout may be configured in size and shape to allow an angle of the light source unit to be adjusted in a grater degree toward at least one direction in relation to axis of the light source than degrees to other directions in relation to the axis.

Moreover, the housing unit may have a support plate. The support plate may have a cutout configured to support the lighting unit. The cutout may be further configured in size and shape to allow an angle of the light source unit to be adjusted in a grater degree toward at least one direction in relation to axis of the light source than degrees to other directions in relation to the axis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
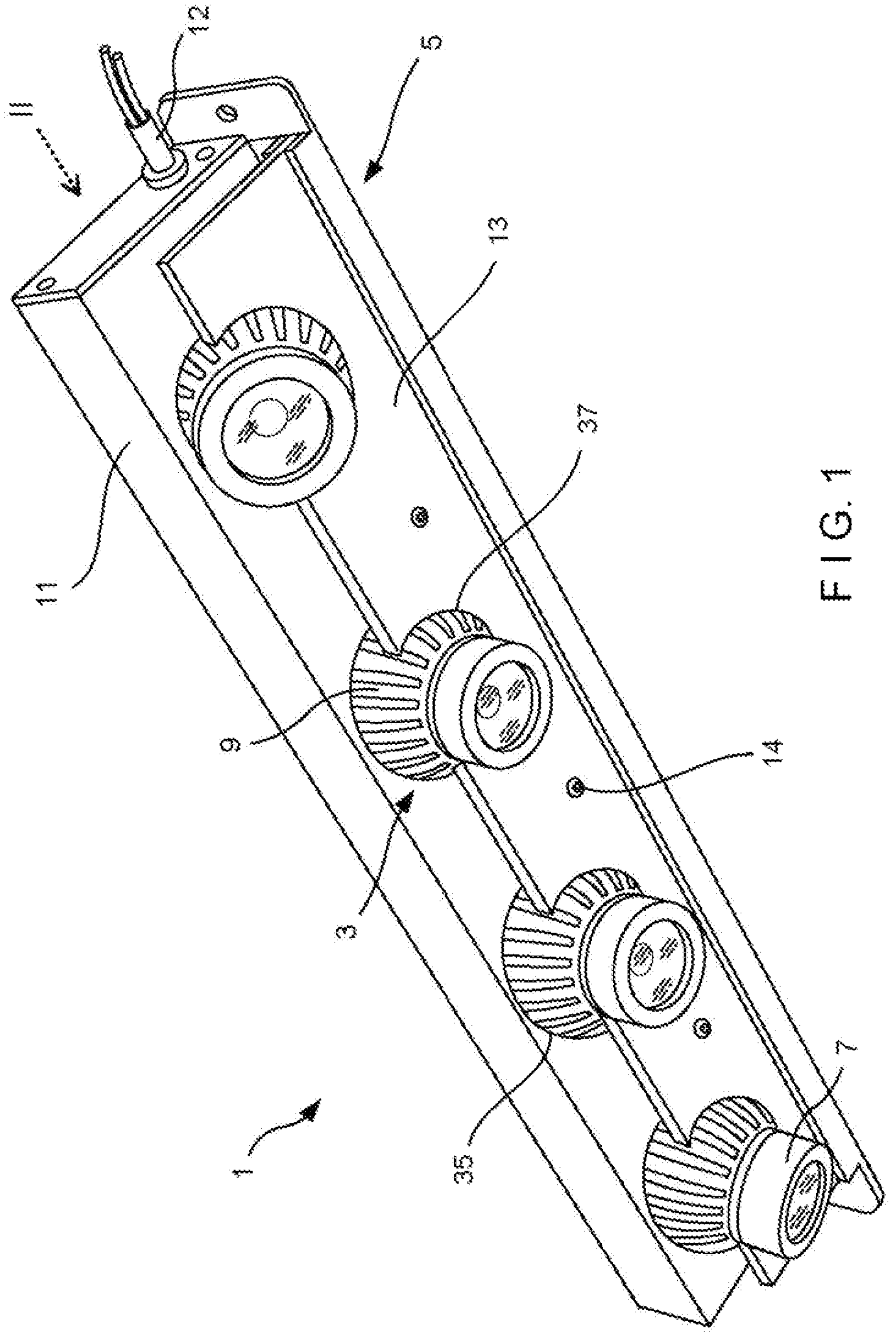
FIG. 1 is a perspective view that shows one embodiment of a lighting device of the present invention, viewed from a bottom of the lighting device as attached to, for example, a wall or a ceiling.

The embodiments will now be described with reference to the accompanying drawings, wherein like reference numerals designate corresponding or identical elements throughout the various drawings. It is noted that the scope of the present invention is not limited to the embodiments shown in the accompanying drawings.

FIG. 1 shows a perspective view of one non-limiting embodiment of a lighting device of the present invention. A lighting device 1 includes a lighting unit 3 and a housing unit 5. In FIG. 1, the lighting device 1 is viewed from a bottom of the lighting device 1, from which the lighting unit 3 is exposed, as attached to, for example, a wall or a ceiling of a shelf, a cabinet or a room.

Figure 2:
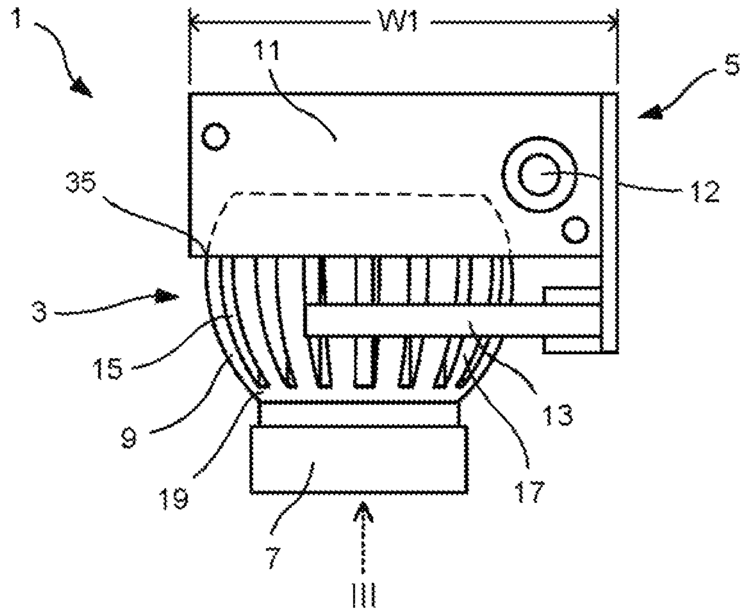
FIG. 2 is a side view of the embodiment shown in FIG. 1, viewed from a direction indicated by arrow II in FIG. 1.

FIG. 2 shows a side view of the lighting device 1 shown in FIG. 1, viewed from a direction indicated by arrow II in FIG. 1. The lighting unit 3 of the lighting device 1 includes a light source unit 7 and a heat sink 9. The heat sink 9 has a hollow body and supports the light source unit 7. In this embodiment, the heat sink 9 is configured to be a casing of the lighting unit 3.

The material properties of the heat sink 9 are not particularly limited as long as the material is heat-conductive and has satisfactory thermal conductivity. Such material may be, for example, metal, plastic, ceramic or glass, as well as a composite material thereof. In the embodiment shown in FIG. 2, the heat sink 9 is made of a metal (e.g., aluminum or aluminum alloy).

The housing unit 5 of the lighting device 1 shown in FIGS. 1 and 2 houses at least a portion of the lighting unit 3. The housing unit 5 includes a housing base 11, a power supplying code 12, and a support plate 13. The housing unit 5 may further include any additional parts or members which may be required to properly operate the lighting unit 3.

The housing base 11 has face plates one of which has an opening 35, through which the heat sink 9 is movably accepted and supported by the housing base 11. In addition, the support plate 13 has a cutout 37 with which the heat sink 9 is also movably supported. Further, the support plate 13 has at least one locking screw 14 to lock illumination angle and direction of the light source unit 7 of the lighting unit 3. In the embodiment shown in FIG. 2, the housing unit 5 has width W1 of approximately 55.0 mm.

Figure 3:
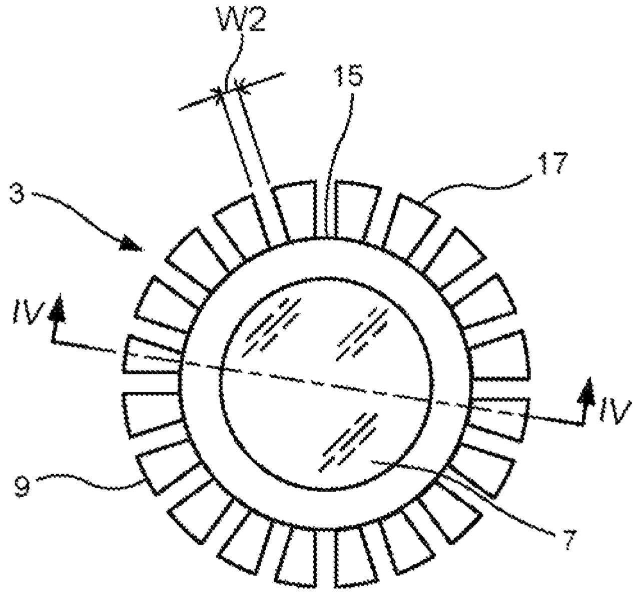
FIG. 3 is a top view of a lighting unit of the embodiment, viewed from a direction indicated by arrow III in FIG. 2.

FIG. 3 shows a top view of the lighting unit 3, viewed from a direction indicated by arrow III in FIG. 2. The heat sink 9 has at least one open groove 15 that allows air to flow between an inside of the hollow body of the heat sink 9 and an outside of the heat sink 9. A configuration of the open groove 15, including position, size, number and shape, may be determined in accordance with, for example, a desired performance in radiating the heat generated by the light source unit 7. Such a configuration of the open groove 15 may also be determined in accordance with a desired external shape of the heat sink 9.

In the lighting unit 3 shown in FIGS. 2 and 3, because there are plural open grooves 15 each having a narrow slit-like shape, a wall of the heat sink 9 forms at least one column 17 connected to the heat sink 9 at least at an open end 19 of the heat sink 9. In this embodiment, each of the plural open grooves 15 has width W2 of approximately 2 mm. Further, because the heat sink 9 is also the casing of the lighting unit 3, the open groove 15 allows air to flow between an inside of the lighting unit 3 and an outside of the lighting unit 3.

Figure 4:
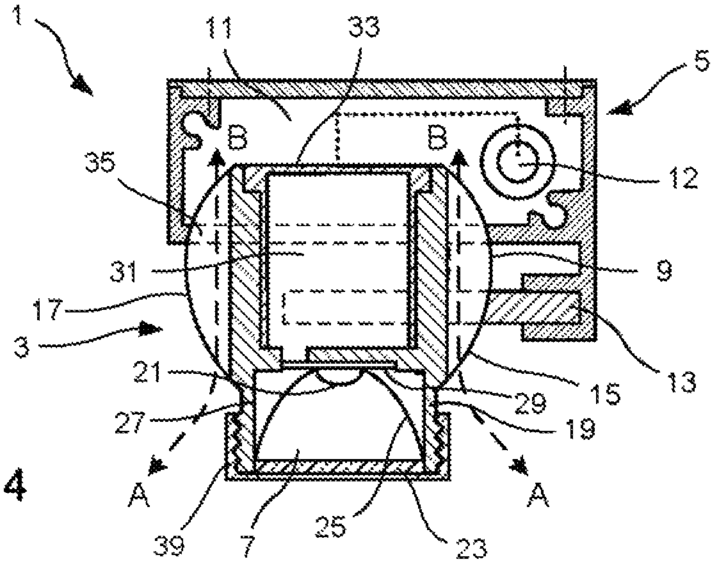
FIG. 4 is a cross sectional view of the embodiment shown in FIG. 2, taken along line IV-IV indicated in FIG. 3.

FIG. 4 is a cross sectional view of the lighting device 1 shown in FIG. 2, taken along line IV-IV indicated in FIG. 3. FIG. 4 shows the flow of air between the inside and outside of the heat sink 9. In this embodiment, because the heat sink 9 has the hollow body and the open groves 15, the air flows between the inside and outside of the heat sink 9 as indicated by arrow-lines A-B. If there were no open groove for air to flow between the inside and outside of the heat sink 9, the heat generated by the light source unit 7 may not be effectively radiated to outside of the heat sink 9 and may be confined in the hollow body of the heat sink 9, thereby impeding the functions of the light source unit 7 and the heat sink 9 of the lighting unit 3.

FIG. 4 also shows the light source unit 7 of the lighting unit 3, provided with a light source 21. The light source 21 may be, for example, a power-LED, a power-LED lamp, a LED, a LED lamp, a fluorescent lamp, an incandescent light bulb, a halogen light bulb, or one of any other publicly known or commercially available light sources. However, a power-LED lamp is particularly suitable as the light source 21 because the power-LED lamp generates heat and requires to have a heat sink which effectively radiates the heat. The lighting device 1 provides the heat sink 9 which effectively radiates the heat generated by the light source 21. In this embodiment, the light source 21 is a power-LED lamp having specifications of operating currents at, for example, 350 mA to 700 mA.

The light source unit 7 shown in FIG. 4 includes a light-source-securing board 29, onto which the light source 21 is fixed. The light-source-securing board 29 may be a printed circuit board. Further, the light-source-securing board 29 is preferably made of a heat-conductive material and attached to the heat sink 9 to secure a position of the light source 21 and to effectively transfer the heat generated by the light source 21 to the heat sink 9 via the light-source-securing board 29. In this regard, the light-source-securing board 29 may be attached to the heat sink 9 with a heat-transfer tape to increase effectiveness of the heat transfer from the light source 21 to the heat sink 9 via the light-source-securing board 29.

As shown in FIG. 4, the light source unit 7 may also include a lens 23, a light-reflecting housing 25, and a light-source-support housing 27 which may support the light source 21, the lens 23, the light-reflecting housing 25. However, two or more of those components of the light source unit 7 may be integrated together to make a configuration of the light source unit 7, for example, simpler or more compact in size.

For example, the lens 23 may be a cone-shaped lens. When the cone-shaped lens is placed over the light source 21 to substantially entirely cover the light source 21, the cone-shaped lens may have a function of the light-reflecting housing 25, and the light source unit 7 may not need to have the light-reflecting housing 25 in addition to the cone-shaped lens. Also, when the open end 19 of the heat sink 9 has a wall, as shown in FIG. 4, which has a function of the light-source-support housing 27, the light source unit 7 may not need to have the light-source-support housing 27. The light-source-securing board 29 may be a part of or integrated to, for example, the light-reflecting housing 25 or the light-source-support housing 27.

Further, with regard to the wall of the open end 19 of the heat sink 9 shown in FIG. 4, the wall of the open end 19 is a ring-shaped cylindrically-extended wall and accepts the light source unit 7 to house and support the light source unit 7 within the heat sink 9. The light source unit 7 may further include a securing frame 39 to secure the light source unit 7 to the open end 19. The securing frame 39 shown in FIG. 4 has a ring-shape with an outer diameter of approximately 28.0 mm. Because the securing frame 39 is placed over the ring-shaped cylindrically-extended wall of the open end 19, a user can hold the securing frame 39 with fingers to easily adjust an illumination angle and direction of the light source unit 7.

The light source unit 7 shown in FIG. 4 substantially completely seals the open end 19 of the heat sink 9. Thus, air effectively flows between the inside and outside of the heat sink 9 as indicated by arrow-lines A-B to radiate the heat via the heat sink 9. However, any one or more of the components of the light source unit 7 may have one or more openings, such as cutouts, slits, grooves and holes, to allow at least a portion of the air to flow between the inside and outside of the heat sink 9 through those openings in the light source unit 7.

Such an opening or openings may be provided, for example, within a body of one of the components of the light source unit 7, at the securing frame 39, between the securing frame 39 and the wall of the open end 19, between the securing frame 39 and the lens 23, at the circumferential edge of the lens 23, or a part or parts at which the light-reflecting housing 25 and the light-source-support housing 27 are attached to each other. In such a configuration, the heat generated by the light source 21 is effectively radiated not only by the air flowing as indicated by arrow-lines A-B, but also by the air flowing through such opening or openings in the light source unit 7.

The heat sink 9 may support the light source unit 7 without having the light source unit 7 positioned within the heat sink 9 as long as the light source unit 7 and the heat sink 9 are attached to each other for the purpose of heat radiation. However, as shown in, for example, FIG. 4, when at least a part of the light source unit 7, preferably at least a part of the light source 21, is provided within the hollow body of the heat sink 9, the heat generated by the light source 21 is effectively transferred to the heat sink 9.

The material properties of the components of the light source unit 7 are not particularly limited as long as a material appropriately supports the components of the light source unit 7. However, as described above with respect to the light-source-securing board 29, the material may be made of a heat-conductive material, such as a metal, including, for example, aluminum and aluminum alloy, so that the heat generated by the light source 21 may be effectively transferred to the components of the light source unit 7, then to the heat sink 9, and effectively radiated to the outside of the lighting unit 3.

However, in this embodiment shown in, for example. FIG. 4, at least the securing frame 39 is made of preferably a non-heat-conductive material so that a user can hold the securing frame 39 with fingers to easily adjust the illumination angle and direction of the light source unit 7 of the lighting unit 3, as described above.

The lighting unit 3 of the lighting device 1 shown in FIG. 4 is provided with a driver board 31 that is connected to the light source 21 via the light-source-securing board 29. The light-source securing board 29 transfers heat generated by the driver board 31 to the heat sink 9 to radiate the heat by the heat sink 9. Also, in this embodiment, the driver board 31 is preferably provided within the hollow body of the heat sink 9 so that the heat generated by the driver board 31 is effectively radiated by the heat sink 9 via air which surrounds the driver board 31 and flows between the inside and outside of the heat sink 9. In addition, the driver board 31 may have one or more additional heat-transfer members attached to the heat sink 9 to increase the heat transfer to the heat sink 9. The driver board 31 may be provided in the housing unit 5, outside of the heat sink 9, if the heat generated by the driver board 31 is not significant and does not require to have the heat sink 9 to radiate the heat, or the housing unit 5 can be configured to more effectively radiate the heat, for example, by additionally providing another heat-radiating member in the housing unit 5.

As shown in, for example, FIG. 4, an external shape of the heat sink 9 may be formed by slicing the hollow body of the heat sink 9 at a top portion of the hollow body to form the open end 19 and at a bottom portion of the hollow body to form a bottom end 33. The bottom end 33 may be a closed surface of the hollow body of the heat sink 9 or may form another open end, similar to the open end 19, which may be a ring-shaped open end connecting at least one gap or at least one column 17, created by one or more of the open grooves 15 of the heat sink 9, at bottom ends of the wall of the heat sink 9. When the bottom end 33 is an open end, the heat generated by the light source 21 and the driver board 31 may be radiated by air flowing into and out from the heat sink 9 through the bottom end 33.

When the light source unit 7 and the driver board 31 are provided within the heat sink 9 of the lighting unit 3 as described above and shown in, for example, FIG. 4, the lighting unit 3 is practically a stand-alone lighting unit that contains all the necessary parts to be operable as a light. Accordingly, the lighting unit 3 can be effectively made small and compact in size.

In the embodiment shown in, for example. FIG. 4, the open groove 15 allows air to naturally flow between the inside and outside of the heat sink 9. However, a ventilating unit, for example, a micro electric fan, may be provided to the lighting device 1. The ventilating unit may be positioned, for example, between the driver board 31 and the bottom end 33 within the heat sink 9, at or near the bottom end 33, in the housing base 11 outside of the heat sink 9, for example, at or near a longitudinal end of the housing base 1 or at any other appropriate position to facilitate the radiation of the heat generated by the light source 21.

Figure 5:
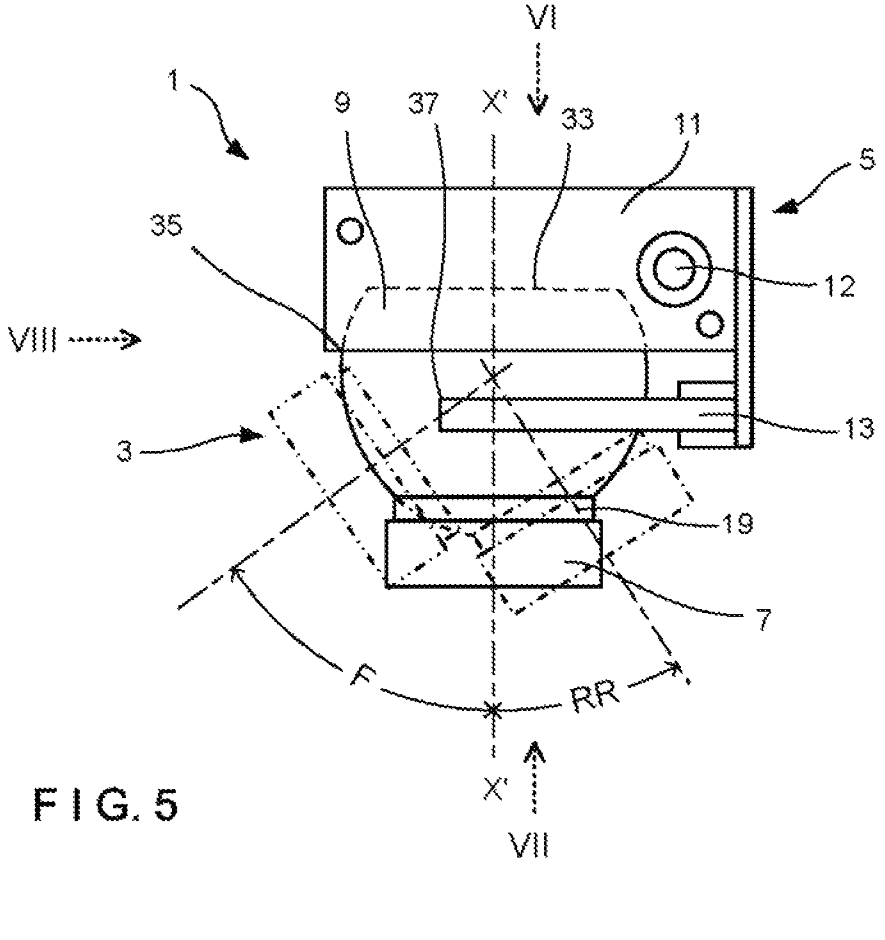
FIG. 5 is the side view of the embodiment shown in FIG. 2, further illustrating an adjustable range of illumination angle and direction of a light source unit of the lighting unit in this embodiment.
Figure 6:
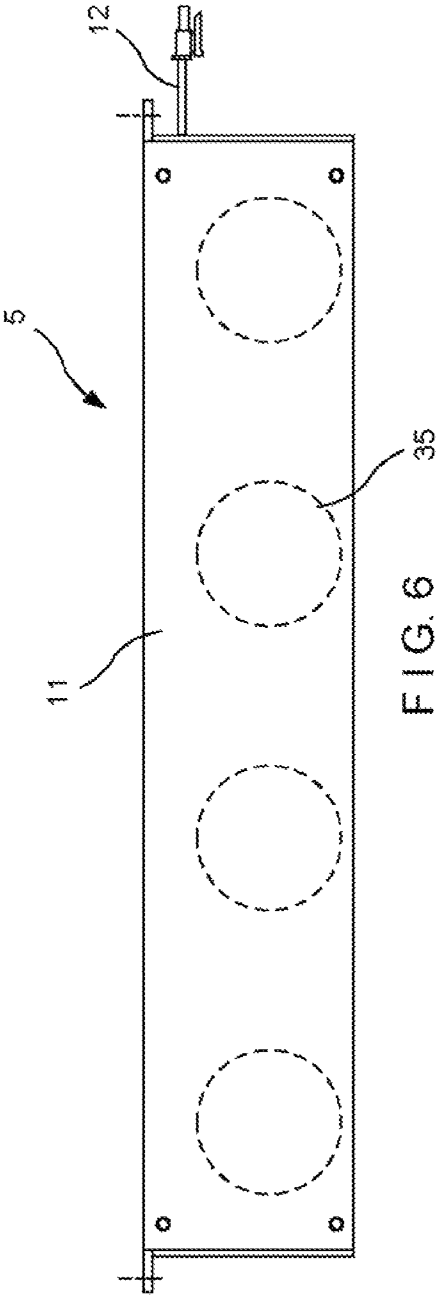
FIG. 6 is a top view of the embodiment, viewed from a direction indicated by arrow VI in FIG. 5.
Figure 7:
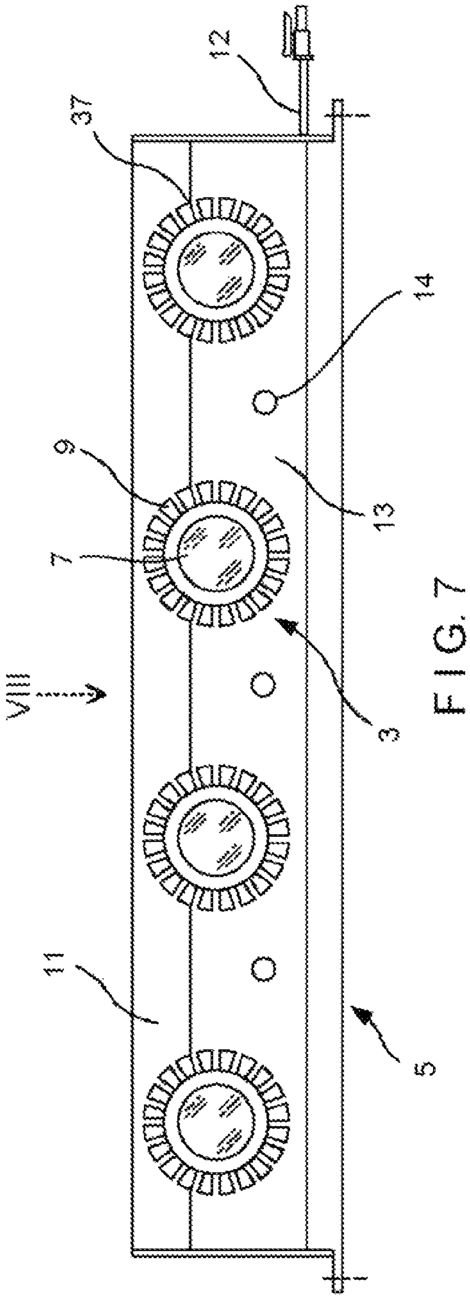
FIG. 7 is a bottom view of the embodiment, viewed from a direction indicated by arrow VII in FIG. 5.
Figure 8:
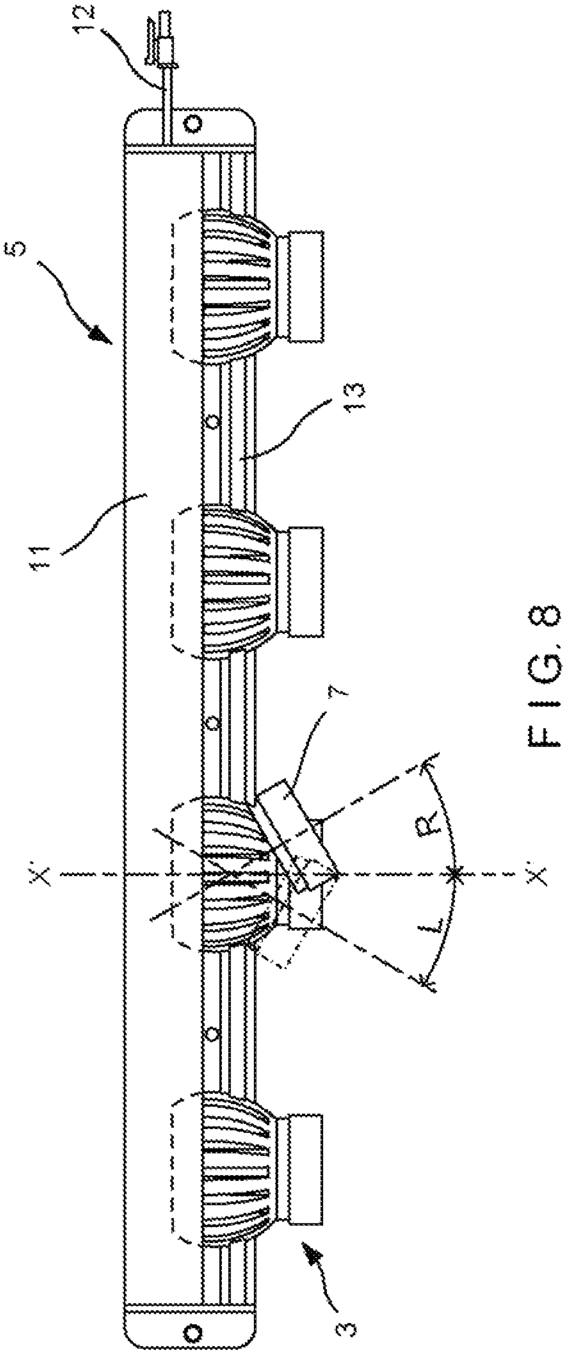
FIG. 8 is a front view of the embodiment, viewed from a direction indicated by arrow VIII in FIGS. 5 and 7.

FIG. 5 shows the side view of the embodiment shown in FIG. 2, further illustrating an adjustable range of illumination angle and direction of the light source unit 7 of the lighting unit 3 in this embodiment. FIG. 6 is a top view of the lighting device 1, viewed from a direction indicated by arrow VI in FIG. 5. FIG. 7 is a bottom view of the lighting device 1, viewed from a direction indicated by arrow VII in FIG. 5. FIG. 8 is a front view of the lighting device 1, viewed from a direction indicated by arrow VIII in FIGS. 5 and 7.

Although the external shape of the heat sink 9 may be of any shape, because the wall of the heat sink 9 in this embodiment has a curved surface, illumination angle of the light source unit 7 of the lighting unit 3 may be adjusted in any direction in relation to axis X'-X' of the light source 21 indicated in FIGS. 5 and 8. Further, the curved surface of the heat sink 9 may be preferably a substantially spherical and smooth surface so that the illumination angle and direction may be effectively and efficiently adjusted.

As shown in FIGS. 5 and 7, the support plate 13 of the housing unit 5 has the cutout 37 to movably accept and support the heat sink 9. Because the cutout 37 in this embodiment is preferably semicircular and creates a front-edge opening at a front side of the support plate 13, which is the side pointed by arrow VIII in FIG. 5, the illumination angle of the light source unit 7 may be adjusted to a direction toward the front side of the support plate 13, at angle F in FIG. 5. The angle F is greater than angles to other directions of, for example, angle RR in FIG. 5 to a rear side of the support plate 13, and angles L and R in FIG. 8 to longitudinal directions of the support plate 13. In this embodiment, the angles F, RR, L and R are each adjustable to a maximum of approximately 55.0°, 33.0°, 28.7° and 28.7°, respectively.

The support plate 13 may have the front-edge opening much wider than that indicated in, for example, FIG. 7, as long as the heat sink 9 is appropriately and movably supported by the support plate 13, so that the illumination angle can be adjusted with a greater degree than, for example, the angle F of 55.0° in FIG. 5, and toward a wider range of the illumination directions in relation to axis X'-X' indicated in FIGS. 5 and 8. However, depending on the needs in, for example, the adjustability of the illumination angle and direction of the light source unit 7 or the stability of the lighting unit 3 in the housing unit 5, the support plate 13 may have the front-edge opening smaller than that shown in, for example, FIG. 7. The cutout 37 may even be a substantially fully circular cutout in the support plate 13 without the front-edge opening. In such configurations, an adjustable range of the illumination angle and direction of the light source unit 7 may be limited and varied by, for example, a size of the front-edge opening, a size or a shape of the cutout 37 in the support plate 13. The support plate 13 may have, instead of the font-edge opening, a rear-edge opening, or a side-edge opening to have the illumination angle and direction of the light source unit 7 adjustable to desired angles and directions.

Further, the housing unit 5 does not need to have the support plate 13 as long as the lighting unit 3 is appropriately and movably accepted and supported by the housing base 11. When the housing base 11 movably accepts and supports the lighting unit 3 without the support plate 13 or similar, it may be considered that the support plate 13 or similar is integrated to the housing base 11 as one of the face plates of the housing base 11. In such case, an adjustable range of the illumination angle and direction of the light source unit 7 may be varied depending on a size or a shape of the opening 35 of the housing base 11 or the cutout 37 of the support plate 13.

The size, shape and material properties of the housing base 11 are not particularly limited, as long as the housing base 11 can movably accept and support at least a portion of the lighting unit 3 by housing at least a portion of the lighting unit 3. The housing base 11 may be in the shape of, for example, a rectangular box, a cylinder pipe, a round box, or any letter-shaped boxes such as a L and S-shaped boxes. The material of the housing base 11 may be, for example, metal, plastic, synthetic resin, or wood.

In the embodiment shown in FIGS. 1-8, the housing base 11 is a rectangular-shaped box with a hollow body. When at least a portion of the heat sink 9 is housed within the housing base 11, air, which flows between the inside and outside of the heat sink 9 through the open groove 15, can flow through the hollow body of the housing base 11 via a part of the open groove 15 housed within the hollow body of the housing base 11.

When at least one of the face plates of the housing base 11, for example, the one having the opening 35, which movably accepts and supports the lighting unit 3, is made of a heat-conductive material such as a metal, the heat generated by the light source 21 is effectively radiated by the housing base 11 via contact between the housing base 11 and the heat sink 9 and also via the air flows through the open grove 15 and the hollow body of the housing base 11.

In addition, one or more of the face plates of the housing base 11, or a portion of one or more of the face plates of the housing base 11, may be removed to have one or more openings in the housing base 11 to increase the air flowing into and out from the heat sink 9 through or via the housing base 11.

The size, shape and material properties of the support plate 13 are not particularly limited, as long as the support plate 13 can movably accept and support the lighting unit 3. The material of the support plate 13 may be, for example, metal, plastic, synthetic resin, or wood. In this embodiment shown in FIGS. 1-8, the support plate 13 is made of plastic so that the support plate 13 is flexible enough to make adjustments of the illumination angle and direction of the light source unit 7 easy. The support plate 13 may be made of a heat-conductive material, such as a metal so that the heat generated by the light source 21 may be effectively radiated through the support plate 13 via contact between the support plate 13 and the heat sink 9.

At least a part of the lighting unit 3, preferably at least a part of the heat sink 9, may be made of a magnetically-attracted material, and at least a part of either or both the housing base 11 and the support plate 13 may be made with a magnet, or vice versa, so that the lighting unit 3 is magnetically attached to and supported by either or both the housing base 11 and the support plate 13 to have the illumination angle and direction of the light source unit 7 more easily and flexibly adjustable. Instead of having the materials being magnetically-attracted or a magnet, the lighting unit 3, preferably the heat sink 9, and either or both the housing base 11 and the support plate 13, may be provided with a magnetically-attracted member and a magnetic member, respectively, and vice versa. When magnetic materials are used to attach the lighting unit 3 to the housing base 11, the front-edge opening of the support plate 13, may be made wider than that shown in FIG. 7 to increase the adjustable range of the illumination angle and direction of the light source unit 7. In this regard, if the lighting unit 3 is magnetically attached to and supported by the housing base 11 with satisfactory stability and movability, the housing unit 5 may not need to have the support plate 13, and the housing base 11 alone may movably accept and support the lighting unit 3.

When using the lighting device 1 of the present invention, the lighting device 1 may be installed on, for example, a wall or a ceiling of a shelf, a cabinet or a room, or any supporting fixture, by a fixing member such as a bolt and nut, a pin, a wire, and an adhesive. The housing unit 5 of the lighting device 1 may house more than one lighting unit 3, as shown in FIGS. 1 and 6-8. Positions of the more than one lighting unit 3 may be arranged as desired, for example, aligned along a straight line or a curved line, or in a circle.

Because the lighting device 1 is configured to be, for example, compact in size, efficient and effective in radiating the heat of the light source 21 and in easily adjusting the illumination angles and directions of the light source unit 7 to desired angles and directions, the lighting device 1 is appropriately used to light, for example, wrist watches, jewelries or small art pieces, displayed in a case, cabinet or shelf in a shop, a boutique, a gallery or a museum.

Figure 9:
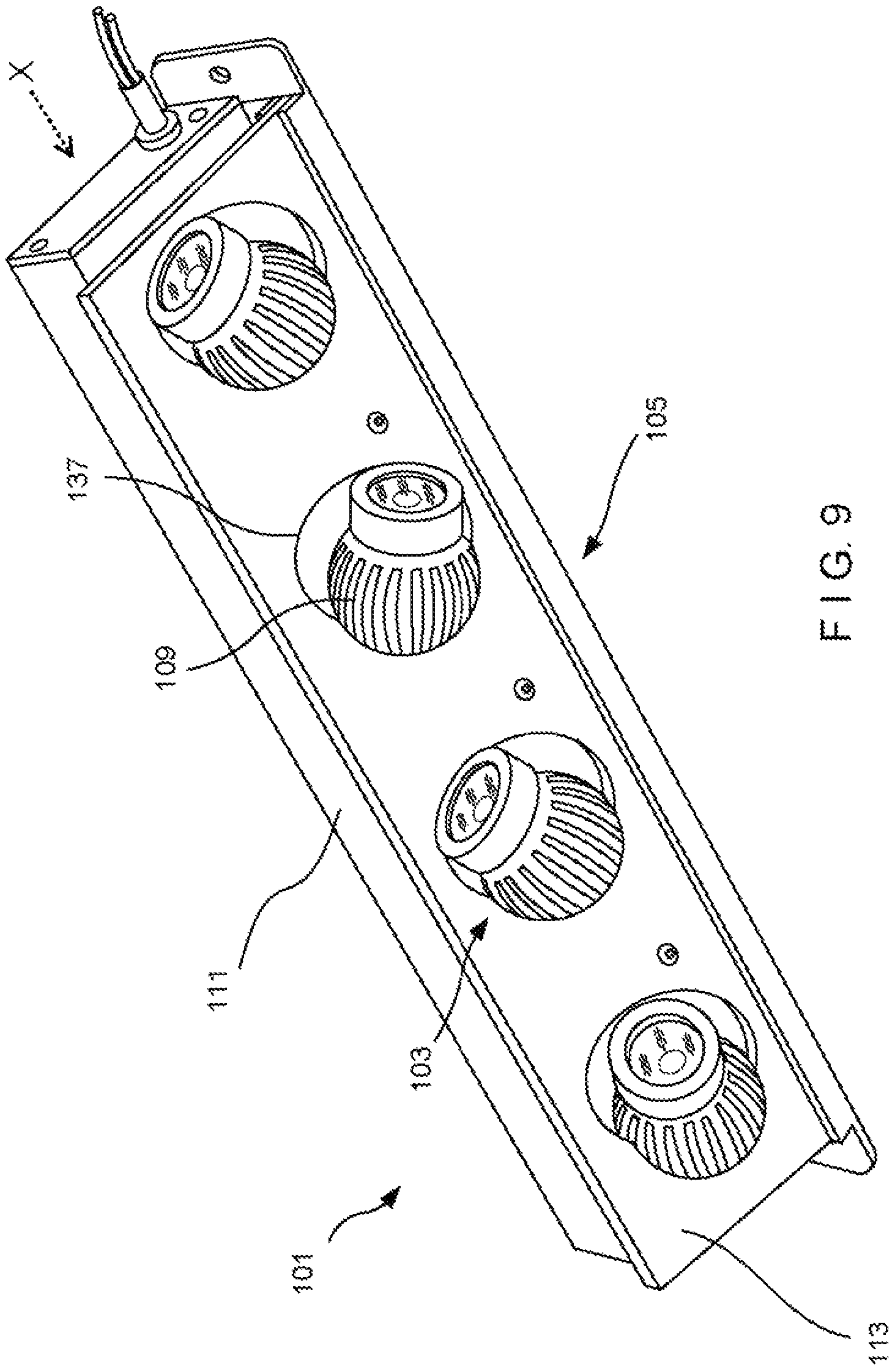
FIG. 9 is a perspective view that shows another embodiment of the lighting device of the present invention, viewed from a bottom of the lighting device as attached to, for example, a wall or a ceiling.
Figure 10:
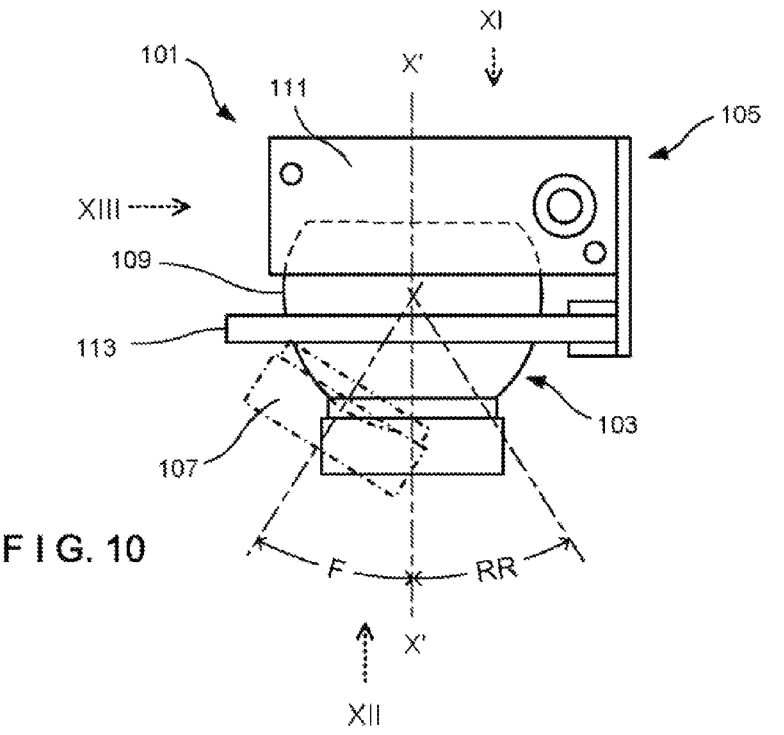
FIG. 10 is a side view of the another embodiment shown in FIG. 9, viewed from a direction indicated by arrow X in FIG. 9, illustrating an adjustable range of illumination angle and direction of a light source unit of a lighting unit in the another embodiment.

FIGS. 9-13 show another non-limiting embodiment of the lighting device of the present invention. FIG. 9 is a perspective view of a lighting device 101, viewed from a bottom of the lighting device 101 as attached to, for example, a wall or a ceiling or a shelf, a cabinet or a room. FIG. 10 is a side view of the lighting device 101, viewed from a direction indicated by arrow X in FIG. 9, and illustrating an adjustable range of an illumination angle and direction of a light source unit 107 of a lighting unit 103 provided in the lighting device 101.

In this another embodiment, the lighting device 101 has the lighting unit 103 substantially similar to the lighting unit 3 in the lighting device 1. However, as shown in FIG. 9, the lighting device 101 is provided with a housing unit 105 having a support plate 113 with a gourd-shaped cutout 137 that has a shape of two round shapes partially overlapping each other, also known as a daruma-doll shape, and is different from the cutout 37 of the support plate 13 of the lighting device 1 shown in, for example, FIGS. 1 and 7.

Figure 11:
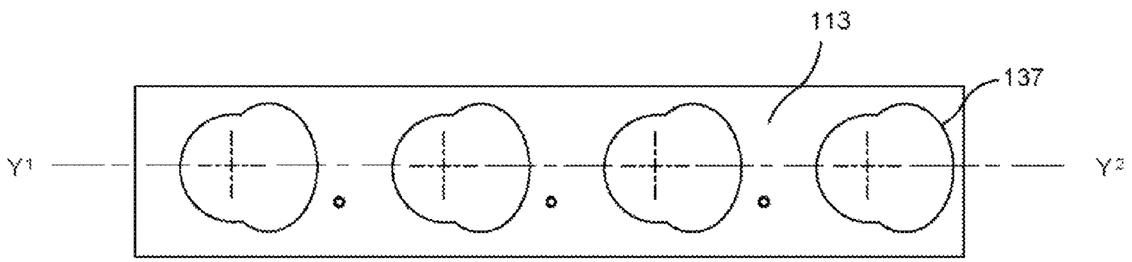
FIG. 11 is a top view of a support plate of the another embodiment, viewed from a direction indicated by arrow XI in FIG. 10.

FIG. 11 is a top view of the support plate 113, viewed from a direction indicated by arrow XI in FIG. 10, illustrating the gourd-shaped cutout 137 of the support plate 113. The gourd-shaped cutout 137 has an extra cutout portion added to a circular cutout portion in a direction along the longitudinal direction $Y^1$-$Y^2$ of the support plate 113.

Figures 12, 13:
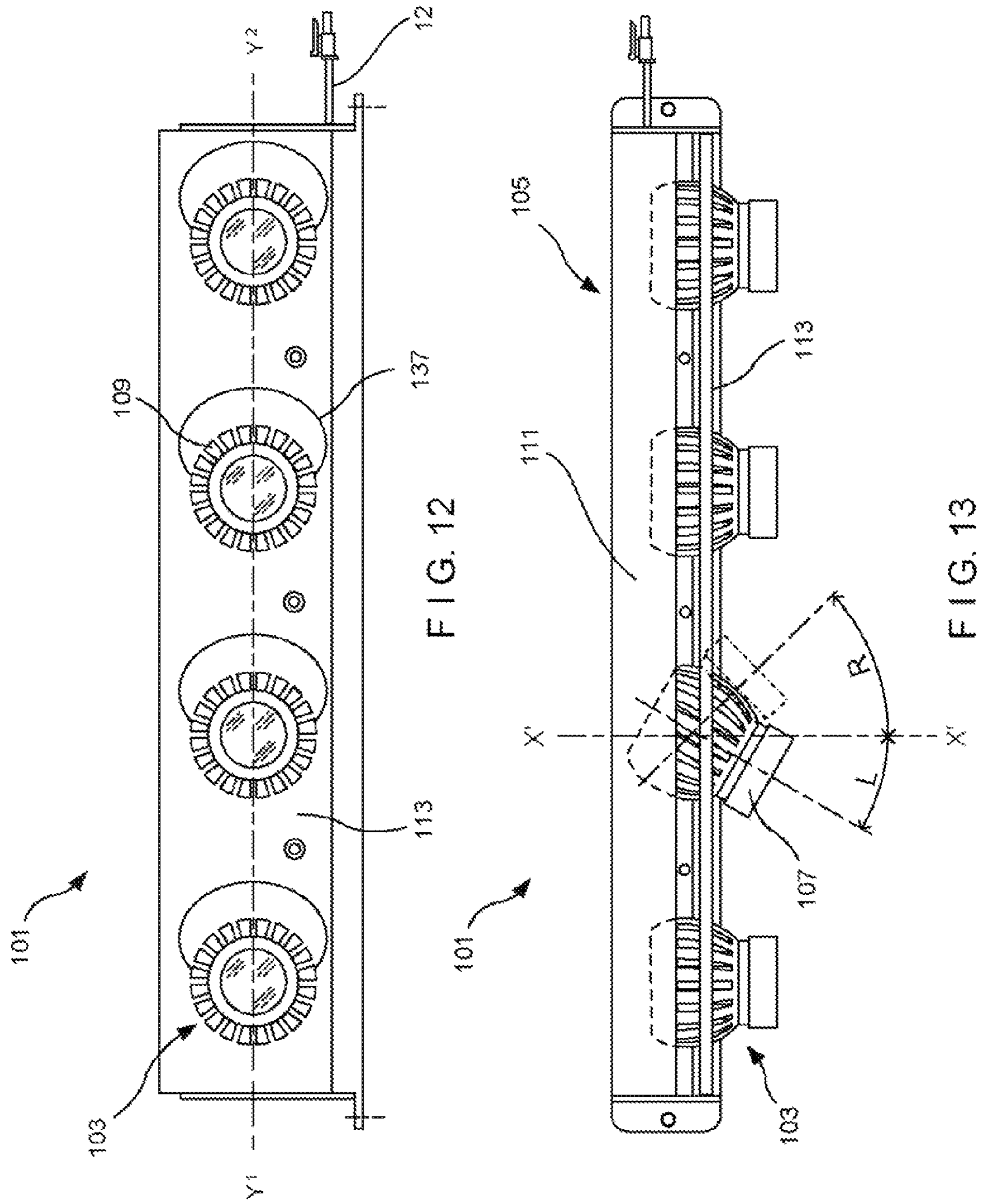
FIG. 12 is a bottom view of the another embodiment, viewed from a direction indicated by arrow XII in FIG. 10.
FIG. 13 is a front view of the another embodiment, viewed from a direction indicated by arrow XIII in FIG. 10.

FIG. 12 is a bottom view of the another embodiment, viewed from a direction indicated by arrow XII in FIG. 10. FIG. 13 is a front view of the another embodiment, viewed from a direction indicated by arrow XIII in FIG. 10.

As shown in FIGS. 12 and 13, when a bottom portion of the lighting unit 103, which is opposite to a portion of the lighting unit 103 having the light source unit 107, is inserted into the housing unit 105 through the gourd-shaped cutout 137, the gourd-shaped cutout 137 provides the extra cutout portion for the light source unit 107 to have illumination angle and direction of the light source unit 107 adjustable toward at least one direction, in relation to axis X'-X' of the light source unit 107 indicated in FIGS. 10 and 13, at a greater degree and range than degrees and ranges toward other directions.

More specifically, when the lighting unit 103 is tilted in the gourd-shaped cutout 137 of the support plate 113 so that a portion of the light source unit 107 sinks into the extra cutout portion of the gourd-shaped cutout 137, the illumination angle of the light source unit 107 may be adjusted toward, for example, $Y^2$ along the longitudinal direction $Y^1$-$Y^2$ of the support plate 113, at a degree greater than degrees when tilted to other directions.

As shown in FIG. 13, the illumination angle of the light source unit 107 in this another embodiment is adjustable to maximum angle R of 48.7° to the direction toward $Y^2$ along the longitudinal direction $Y^1$-$Y^2$ of the support plate 113. The maximum angle R of 48.7° is greater than maximum angles F and RR toward a front and rear directions, as indicated in FIG. 10, maximum angle L toward a direction opposite to the angle as indicated in FIG. 13, and also the maximum angles L and R of the light source unit 7 shown in FIG. 8. For example, in the another embodiment shown in FIGS. 10 and 13, the maximum angles F, RR, L are each approximately 33.7°. In the embodiment shown in FIG. 8, the maximum angles L and R are each approximately 28.7°.

The extra cutout portion of the gourd-shaped cutout 137 may be added to the circular cutout portion toward any directions other than the direction toward $Y^2$ along the longitudinal direction $Y^1$-$Y^2$ of the support plate 113 as shown in FIG. 11 depending on a desired direction toward which a user wants to tilt the light source unit 7 with a greater degree of angle. Also, a size of the extra cutout portion may be larger or smaller depending on a desired adjustable degree and range of the illumination angle and direction of the light source unit 7. In addition, the support plate 113 may have more than one extra cutout portion added to the circular cutout portion of the gourd-shaped cutout 137, as long as the support plate 113 can appropriately and movably accept and support the lighting unit 3, so that the illumination angle of the light source unit 107 may be adjusted toward more than one direction at degrees greater than degrees when tilted toward other directions.

Besides those described and discussed above with regard to the gourd-shaped cutout 137, with regard to the size, shape and material properties of components of the lighting device 101 such as the light source unit 107 and the heat sink 109 of the lighting unit 103, and the housing unit 105, the above descriptions and discussions with regard to the lighting device 1 similarly apply to those components.

Obviously, numerous modifications and variations of the present invention are possible in light of the above teachings. It is therefore to be understood that within the scope of the appended claims, the invention may be practiced otherwise than as specifically described herein.

The invention claimed is:

1. A lighting device comprising:
at least one lighting unit including
a light source unit having a light source, and
a heat sink configured to support the light source unit, the heat sink having at least one open groove that allows air to flow between an inside of the lighting unit and an outside of the lighting unit; and
a housing unit configured to house at least a part of the lighting unit to support the lighting unit, wherein
the housing unit has a cutout configured to house at least the part of the lighting unit to support the lighting unit, and
the cutout of the housing unit is configured in size and shape to allow an angle of the light source unit to be adjusted in relation to an axis of the light source.

2. The lighting device according to claim 1, wherein
the heat sink has a hollow body.

3. The lighting device according to claim 2, wherein
the light source unit is provided inside the hollow body of the heat sink.

4. The lighting device according to claim 1, wherein
the heat sink has at least two open grooves.

5. The lighting device according to claim 1, wherein
the cutout of the housing unit is configured in size and shape to allow the angle of the light source unit to be adjusted toward at least one direction in relation to the axis of the light source with a greater degree than degrees toward other directions in relation to the axis.

6. A lighting device comprising:
at least one lighting unit including
a light source unit having a light source, and
a heat sink configured to support the light source unit, the heat sink having at least one open groove that allows air to flow between an inside of the lighting unit and an outside of the lighting unit; and
a housing unit configured to house at least a part of the lighting unit to support the lighting unit, wherein
at least a portion of an outer surface of the heat sink has a curved surface, and
the curved surface of the heat sink is substantially spherical.

7. The lighting device according to claim 6, wherein
the heat sink has a hollow body.

8. The lighting device according to claim 7, wherein
the light source unit is provided inside the hollow body of the heat sink.

9. The lighting device according to claim 6, wherein
the heat sink has at least two open grooves.

10. A lighting device comprising:
at least one lighting unit including
a light source unit having a light source, and
a heat sink configured to support the light source unit, the heat sink having at least one open groove that allows air to flow between an inside of the lighting unit and an outside of the lighting unit; and
a housing unit configured to house at least a part of the lighting unit to support the lighting unit, wherein
the housing unit has a support plate, the support plate has a cutout configured to support the lighting unit, and the cutout of the support plate is further configured in size and shape to allow an angle of the light source unit to be adjusted in relation to an axis of the light source.

11. The lighting device according to claim 10, wherein the cutout of the support plate is further configured in size and shape to allow the angle of the light source unit to be adjusted toward at least one direction in relation to the axis of the light source with a greater degree than degrees toward other directions in relation to the axis.

12. The lighting device according to claim 10, wherein the heat sink has a hollow body.

13. The lighting device according to claim 12, wherein the light source unit is provided inside the hollow body of the heat sink.

14. The lighting device according to claim 10, wherein the heat sink has at least two open grooves.

* * * * *